United States Patent Office 3,273,292
Patented Sept. 20, 1966

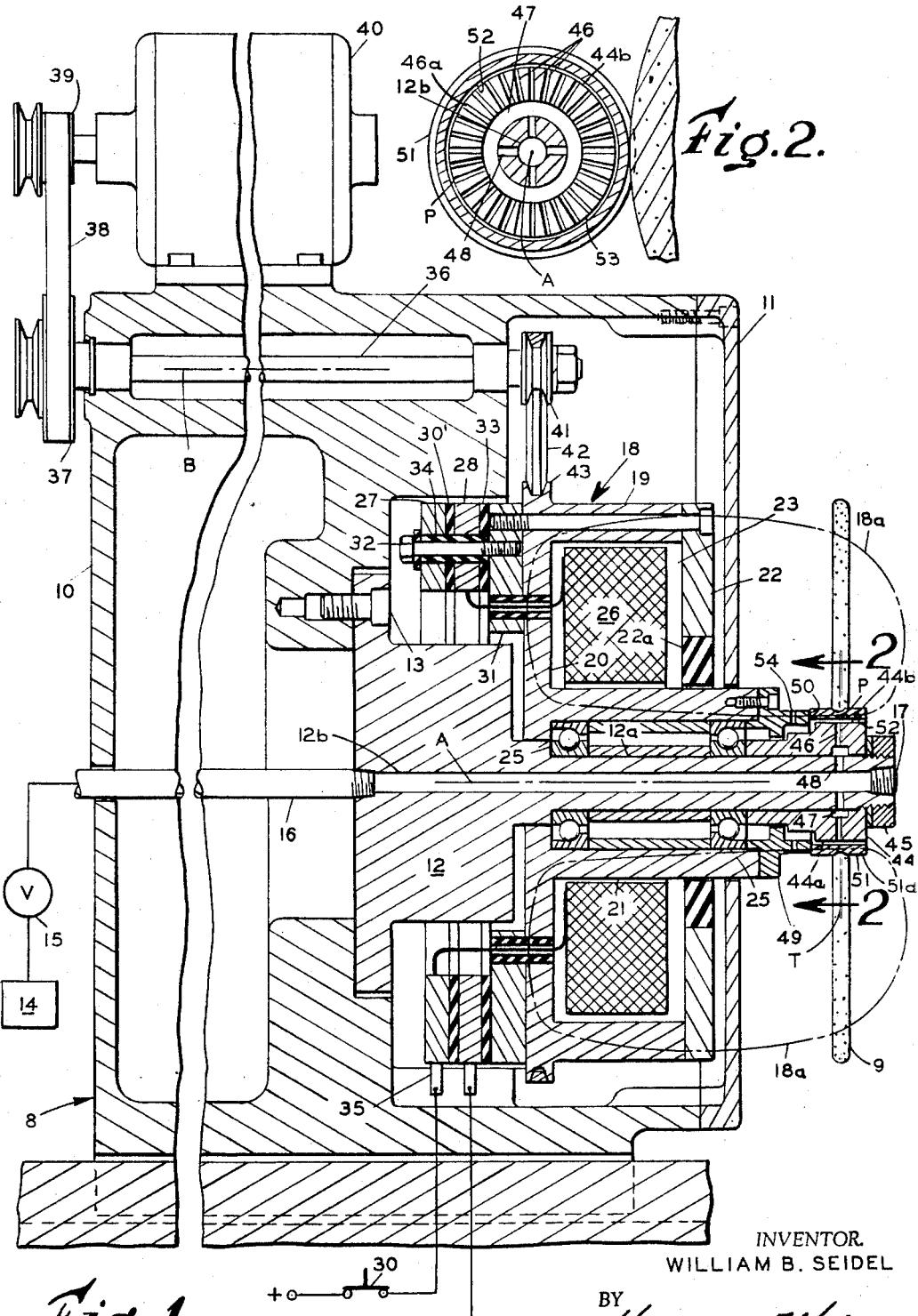

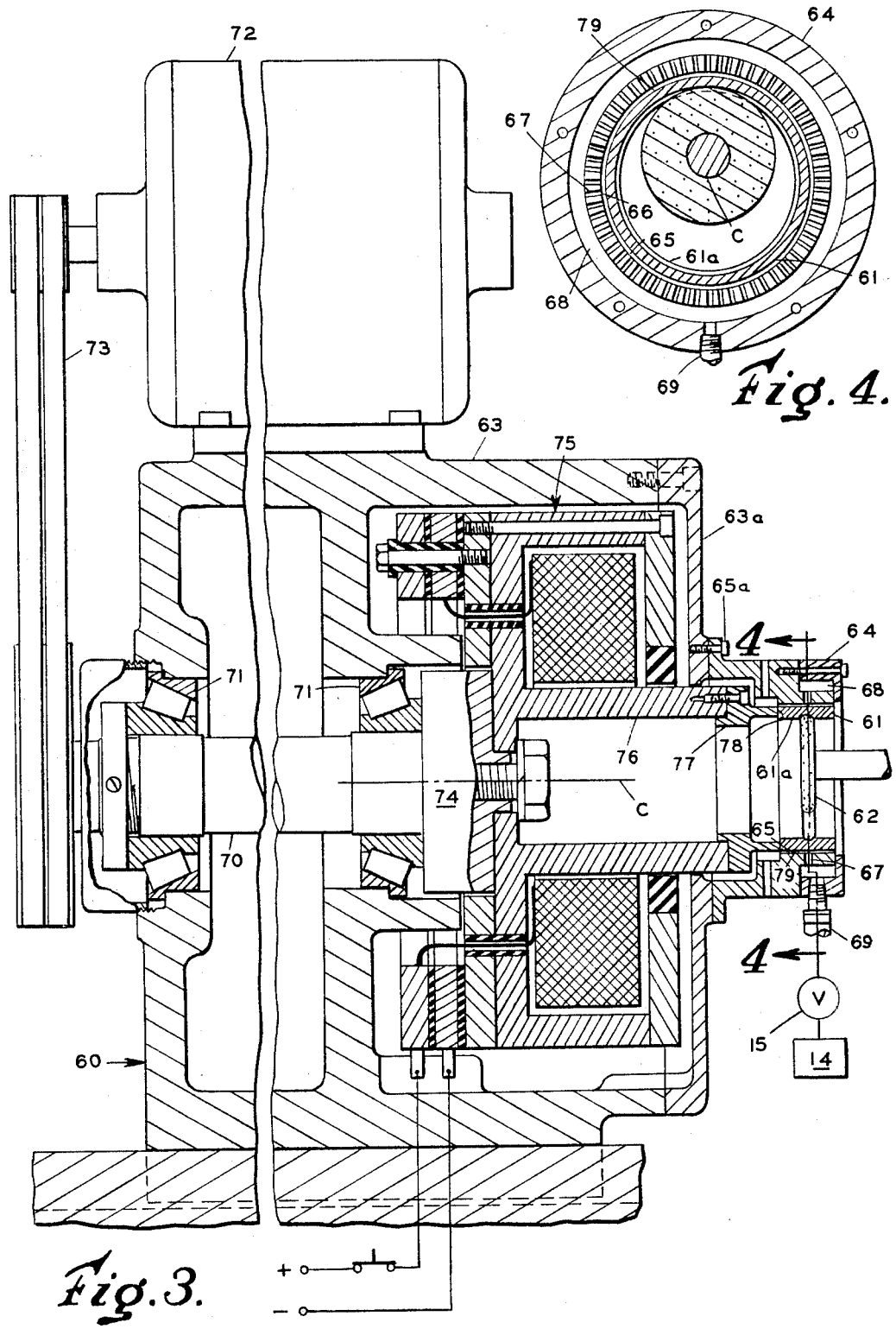

3,273,292
MACHINE TOOL HEADSTOCK
William B. Seidel, Cincinnati, Ohio, assignor to The
Cincinnati Milling Machine Co., Cincinnati, Ohio,
a corporation of Ohio
Filed Oct. 16, 1963, Ser. No. 316,643
4 Claims. (Cl. 51—237)

The present invention relates to a headstock for supporting and driving a workpiece during a grinding operation thereon.

It has previously been proposed to support a workpiece to be ground in closely spaced relation to a rotating support surface on a workpiece driver by means of fluid introduced between the workpiece and the support surface, as disclosed in the copending U.S. patent application Serial No. 230,365, filed October 15, 1962 (now U.S. Patent 3,209,494), by the same inventor as the present invention and assigned to the same assignee. It was also proposed in that patent application to use a stationary support mounted on a slide in front of the headstock for insertion of the support into a workpiece received on the driver rotatably mounted in the headstock. It was recognized therein that a stationary support, divorced from the rotating headstock driver, would be free of any wobble due to run out or eccentricity which could result if the support were rotated. Mounting a stationary support outside the headstock, however, increases the difficulty of loading and unloading workpieces, since the support must be retracted from the workpiece after each grind, a time consuming operation not necessary when the support surface is on the driver and rotates therewith.

There is provided in the present invention, a headstock offering the advantages of a stationary support with easy access to a workpiece mounted thereon for stable fluid support of the workpiece and quick loading and unloading thereof. In brief, a head secured to the headstock has a surface of circular cross section to receive a workpiece. The head is adapted for connection to a source of fluid under pressure which is discharged from the head around the workpiece to support the workpiece. A drive member, rotatably mounted in the headstock and terminating at said head surface, engages the workpiece to rotate the workpiece relative to the head.

It is therefore an object of the present invention to provide a fixed headstock support member for stable fluid support of a workpiece driven by a headstock driver which will permit easy access to a workpiece supported thereby for loading and unloading of workpieces.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a cross-sectional side view of one embodiment of the headstock of the present invention;

FIG. 2 is a view taken on the line 2—2 of FIG. 1;

FIG. 3 is a cross-sectional side view of another embodiment of the present invention; and FIG. 4 is a view taken on the line 4—4 of FIG. 3.

The headstock 8 of FIGS. 1 and 2 is constructed to support and rotate an annular workpiece 51 for a grind on the external surface 51a thereof by a rotating grinding wheel 9. The headstock 8 has a housing 10 having a cover 11 to close the forward end thereof. A member 12 is rigidly secured in the housing by bolts 13. Member 12 has a forwardly extending portion 12a of circular cross-section defining a fixed stud which is centered with respect to horizontal axis A. The stud 12a has a central axially extending fluid air passage 12b which is in communication with a source 14 of air under pressure through pressure regulating valve 15 and pipe 16 connected to member 12. The forward end of passage 12b is closed by plug 17.

An electric magnet 18 has an outer wall 19, a rear base 20, an inner hollow core 21, and a front cover 22 which enclose an annular recess 23. The hollow core 21 is received over the stud 12a and the magnet is supported thereon for rotation by ball bearings 25. The annular recess 23 receives a winding 26 therein which is electrically connected to two slip rings 27 and 28. The slip rings, which are insulated from each other by insulating ring 30', are mounted in stacked relation on an annular plate 31 connected to the base 20 of the magnet by bolts 32. The rings are insulated from the plate 31 by insulating ring 33 and insulating bushings 34. Electrical current is conducted to winding 26, when switch 30 is closed, from brushes 35 mounted in the housing and engaged with the slip rings.

A drive shaft 36 is journaled in the housing for rotation on an axis B which is parallel to, and spaced from, axis A. Drive shaft 36 extends through the rear of the housing and has a pulley 37 thereon outside the housing which is connected, through belt 38 to a pulley 39 mounted on the shaft of electric motor 40, secured to the top of the housing. The front end of drive shaft 36 has a pulley 41 thereon which is connected through belt 42 to a pulley 43 on the magnet.

A vent head 44 is wedged between nut 45 threadedly received on the end of the stud 12a and the inner race of the forward bearing 25, and is thereby secured on the stud 12. The head has a cylindrical portion 44a outside the headstock which has an outer periphery, or surface portion, 44b centered with respect to axis A. Surface portion 44b has a plurality of equally angularly spaced apertures, or orifices 46a, all lying in a common plane T passing through the grinding wheel 9. A plurality of equally angularly spaced restricted passages 46 in head portion 44a connect orifices 46a with the fluid passage 12b through annular groove 47 in the head portion 44a and through radial passages 48 in the stud.

An annular nose piece 49 is connected to the front end of the hollow core 21 of the magnet. The nose piece, which is centered with respect to axis A, has an annular face 50 at its forward end which is also centered with respect to axis A and normal thereto. Face 50 is adjacent head portion 44a so that an annular workpiece 51, received over head portion 44a and with one end abutting face 50 as shown in FIG. 1, has its inner surface 52 in registration with the orifices 46a but spaced from vent head surface 44b. A flux path 18a is established, when switch 30 is closed, through wall 19, base 20, core 21, nose piece 49, and workpiece 51 to magnetically attract workpiece 51 against face 50. The magnetic force is not generally great enough to prevent lateral movement of the workpiece, but it is sufficient to rotate the workpiece as the nose piece rotates. Thus, the magnet 18 and nose piece 49 define a magnetic driver, or drive member, which slidably grips the workpiece for rotation thereof relative to the stationary vent member 44. When switch 30 is opened, workpiece 51 can be easily removed from face 50. Preferably, the member 12 (including stud 12a) and the head 44 are made of nonmagnetic stainless steel, and at least the inner portion 22a of cover 22 is made of nonmagnetic material, such as plastic, to minimize diversion of flux from the flux path through the nosepiece.

When a workpiece 51 is in the grinding position shown in FIG. 1, air under pressure flows continuously from source 14 through stud passage 12b and is discharged through the restricted passages 46 into annular gap 53 between periphery 44b and the inner surface 52 of the annular workpiece. The air flows forwardly and rearwardly in the gap 53 (that is, to the right and left as viewed in FIG. 1). The gap 53 is narrow and restricts the flow therethrough so that a particular pressure P develops in the gap at each orifice which, at any given orifice, is a function of the span of the gap at that orifice, the larger the gap, the smaller the pressure P. The different pressures P all around the workpiece will be balanced only when the workpiece is centered with respect to head portion 44a, and hence with respect to axis A, so that the fluid pressure in the gap always tends to center the workpiece. It will be noted that air flowing rearwardly from the gap escapes through radial passages 54 in the nosepiece.

If there is any run out or eccentricity in the nose piece of the drive member it will not cause any lateral oscillation of the workpiece since the force exerted by the air discharging from the stationary vent head 44 is much greater than any lateral force which could be exerted on the workpiece by the rotating magnet.

The headstock 60 of FIGS. 3 and 4 is constructed to support and rotate an annular workpiece 61 for a grind on the internal surface 61a thereof by rotating grinding wheel 62. The headstock has a housing 63 with a front cover 63a. An annular vent head 64 is secured to housing cover 63a by bolts 65a and is centric with respect to a horizontal axis C. The vent head 64 has an inner cylindrical surface 65 with a plurality of angularly spaced orifices 66 therein, all lying in a common plane normal to axis C, each of which is connected by a restricted radial passage 67 to an annular chamber 68. Fluid under pressure is supplied to chamber 68 by pipe 69 which is connected to the source of air under pressure 14 through pressure regulating valve 15.

The headstock 60 has a drive shaft 70 rotatably mounted in the housing on axis C by bearings 71. Drive shaft 70 is rotated by motor 72, mounted on the housing, through belts 73. The front end of the drive shaft has a flange 74 which is connected to an electric magnet 75 similar to the magnet 18. Magnet 75 has a hollow central core 76 to which is connected an annular nosepiece 77, centric with axis C, having an annular end face 78 which is also centric with respect to axis C and normal thereto. When the workpiece 61 is received inside the fixed vent head 64, the outer surface 79 of the workpiece is spaced from surface 65 but is in registration with the orifices 66 therein, and the workpiece is supported by the stationary vent head. When switch 30 is closed, the nose piece is magnetized to grip and rotate the workpiece.

Although, in either embodiment of the invention, lateral movement of the workpiece is possible when the grinding wheel is initially fed laterally into the workpiece, the air discharged from the vent head urges the workpiece back to a central position with respect to the axes A or C, and the workpiece becomes centered as the grinding force on the workpiece diminishes.

What is claimed is:
1. A headstock for a machine tool comprising:
 (a) a housing,
 (b) a fixed member tightly secured in said housing and having a fixed vent head positioned outside the housing on an axis to receive an annular workpiece, said vent head adapted for connection to a source of fluid under pressure and having a surface of circular cross section centric with respect to said axis for registration with the workpiece, said surface having a plurality of orifices equally angularly spaced around said axis and said vent head having a plurality of passages to connect said orifices to the source of fluid under pressure,
 (c) a drive member surrounding said fixed member mounted in the housing for rotation on said axis, said drive member terminating in a magnetic annular end face outside the housing adjacent said vent head, said annular end face centric with respect to said axis and effective when magnetized to grip one end of the workpiece and rotate the workpiece relative to the vent head,
 (d) means to magnetize said magnetic annular end face,
 (e) and means to rotate said drive member.
2. A headstock for a machine tool comprising:
 (a) a housing,
 (b) a stud tightly secured in said housing and having a fluid passage therein,
 (c) a fixed head on said stud having an external surface portion of circular cross section to receive a workpiece thereon, said head having a plurality of restricted radial passages in fluid communication with the stud passage, said passages terminating in orifices in said surface portion,
 (d) a magnetic driving member surrounding said stud inside the housing and rotatable relative thereto, said driving member terminating in an annular nose adjacent said surface portion of the head and concentric therewith,
 (e) a magnet to magnetize the driving member,
 (f) and means to rotate the driving member.
3. A headstock for a grinding machine comprising:
 (a) a housing,
 (b) a stud tightly secured in said housing and having one end extending outside the housing, said stud having a fluid passage therein closed at said one end,
 (c) a head tightly secured on said stud and having a cylindrical portion outside the housing, said cylindrical portion having a central axis and a plurality of restricted radial passages in fluid communication with the stud passage,
 (d) a selectively magnetized drive member surrounding said stud inside the housing and rotatable on the central axis of the head, said drive member terminating in an annular nose piece adjacent the inner end of the cylindrical portion of the head, said nose piece having an annular face normal to said central axis and centric with respect thereto,
 (e) a drive shaft mounted in the housing and connected to said drive member,
 (f) and means to rotate said drive shaft.
4. A headstock for supporting and rotating an annular workpiece comprising in combination:
 (a) a housing,
 (b) a stud tightly secured in said housing on a horizontal axis and having one end extending outside the housing, said stud having an axially extending fluid passage therein closed at said one end,
 (c) a head tightly secured on said stud and having a cylindrical portion outside the housing to receive an annular workpiece thereon with clearance, said cylin- drical portion concentric with said stud and having a plurality of restricted radial passages in fluid communication with the stud passage,
(d) a selectively energized electric magnet having a hollow core rotatably mounted on said stud inside the housing for rotation on said axis,
(e) an annular nose piece connected to said magnet concentric with said head, said nose piece having an annular end face normal to said axis and at the inner end of the cylindrical portion of the head,
(f) a drive shaft journaled in the housing parallel to said axis and spaced therefrom,
(g) means connecting the drive shaft to the magnet for rotation thereof,
(h) and a motor connected to the drive shaft.

References Cited by the Examiner

UNITED STATES PATENTS

| | | | |
|---|---|---|---|
| 614,190 | 11/1898 | Walker | 51—237 |
| 2,715,304 | 8/1955 | Dix | 51—236 |
| 2,784,534 | 3/1957 | Townsend | 51—103 |
| 3,056,238 | 10/1962 | Hahn | 51—236 |
| 3,145,507 | 8/1964 | Price | 51—237 |

FOREIGN PATENTS 893,865   4/1962   Great Britain.

HAROLD D. WHITEHEAD, *Primary Examiner.*